(12) United States Patent
Mugnaini et al.

(10) Patent No.: US 10,724,934 B2
(45) Date of Patent: Jul. 28, 2020

(54) METHOD FOR VALIDATING A RESONATOR

(71) Applicant: INL—INTERNATIONAL IBERIAN NANOTECHNOLOGY LABORATORY, Braga (PT)

(72) Inventors: Veronica Mugnaini, Braga (PT); Dmitri Y Petrovykh, Braga (PT)

(73) Assignee: INL—INTERNATIONAL IBERIAN NANOTECHNOLOGY LABORATORY, Braga (PT)

(*) Notice: Subject to any disclaimer, the term of this patent is extended or adjusted under 35 U.S.C. 154(b) by 0 days.

(21) Appl. No.: 16/309,572

(22) PCT Filed: Jun. 9, 2017

(86) PCT No.: PCT/EP2017/064157
§ 371 (c)(1),
(2) Date: Dec. 13, 2018

(87) PCT Pub. No.: WO2017/216067
PCT Pub. Date: Dec. 21, 2017

(65) Prior Publication Data
US 2019/0277742 A1    Sep. 12, 2019

Related U.S. Application Data

(60) Provisional application No. 62/349,262, filed on Jun. 13, 2016.

(30) Foreign Application Priority Data

Jul. 12, 2016  (EP) .................................. 16179080

(51) Int. Cl.
*G01N 11/16*    (2006.01)

(52) U.S. Cl.
CPC .... *G01N 11/16* (2013.01); *G01N 2291/02818* (2013.01)

(58) Field of Classification Search
None
See application file for complete search history.

(56) References Cited

U.S. PATENT DOCUMENTS 6,006,589 A  * 12/1999  Rodahl .................... G01G 3/16
                                                310/316.01
2008/0257036 A1* 10/2008 Chaudoreille ......... G01N 9/002
                                                73/32 A
2014/0004529 A1*  1/2014  Shinobu ............... G01N 27/221
                                                435/7.1

FOREIGN PATENT DOCUMENTS

EP         2 278 298 A1    1/2011

OTHER PUBLICATIONS

Kanazawa, K., K., and Gordon II, J., G., "The oscillation frequency of a quartz resonator in contact with liquid," Analytica Chimica Acta, vol. 175, pp. 99-105 (1985) (See Abstract).

(Continued)

*Primary Examiner* — Paul M. West
*Assistant Examiner* — Mark A Shabman
(74) *Attorney, Agent, or Firm* — Xsensus LLP

(57) ABSTRACT

Method for validating a resonator. The method comprises: providing a first set of resonator responses of the resonator pertaining to a first validation fluid, contacting the resonator and a second validation fluid, wherein the first and the second validation fluids have different viscoelastic properties, obtaining in contact with the second validation fluid a second set of resonator responses of the resonator, wherein each resonator response pertains to a resonance frequency or a dissipation of the resonator, validating the resonator by comparing a first and a second value, the first value being obtained from at least one resonator response of the first set (Continued)

of resonator responses and at least one resonator response from the second set of resonator responses, the second value being based on a relationship between frequency or dissipation responses of the resonator and a function of the viscoelastic properties of the first and the second validation fluid.

15 Claims, 10 Drawing Sheets

(56) References Cited

OTHER PUBLICATIONS

Müller, L., et al., "Investigation of prothrombin time in human whole-blood samples with a quartz crystal biosensor," Analytical Chemistry, vol. 82, No. 2, pp. 658-663 (Jan. 15, 2010).
International Search Report and Written Opinion for International Application No. PCT/EP2017/064157, dated Sep. 22, 2017.
Extended European Search Report for European Application No. 16179080.3, dated Sep. 20, 2017.
C. D. Stockbridge, in Vacuum Microbalance Techniques (Plenum, New York, 1966), vol. 5, p. 147.
Sauerbrey, G., "The Use of Quartz Oscillators for Weighing Thin Layers and for Microweighing," Zeitschrift far Physik, vol. 155, No. 2, pp. 206-222 (1959).

* cited by examiner

FIG. 2a  FIG. 2b

METHOD FOR VALIDATING A RESONATOR

CROSS-REFERENCE TO RELATED APPLICATIONS

This application is a National Stage Application based on PCT/EP2017/064157, filed on 9 Jun. 2017, which claims benefit of U.S. provisional application No. 62/349,262, filed on 13 Jun. 2016, and claims priority to European Patent Application No. 16179080.3, filed on 12 Jul. 2016, the entire contents of which being incorporated herein by reference.

TECHNICAL FIELD

The present invention relates to a method for validating a resonator.

BACKGROUND

The fast and progressive growth of the biotechnology and pharmaceutical fields forces the development of new and powerful sensing techniques for process optimization and detection of biomolecules at very low concentrations in a fluid. To this end, in situ and real time surface adsorption studies of bio-molecules are of high interest to monitor the interactions occurring at the solid-liquid interface to eventually manipulate them towards the engineering of novel sensing devices for measuring low concentrations of the molecules in fluids. In recent years, label-free techniques such as mechanical resonators, have become an emerging and promising technology for biosensing applications, due to their small size, fast response, high sensitivity and their compatibility with integration into "lab-on-a-chip" devices. The mechanical resonators may, for example, be cantilever based. The adsorption of molecules and the biomolecular recognition on the cantilever surface may thereby be detected by monitoring cantilever bending or shifts in the resonance frequency of the cantilever.

Molecular adsorption phenomena occurring in a fluid may alternatively be detected by utilizing sensing instruments based on acoustic waves at surfaces. As an example, a quartz crystal microbalance, QCM, may be used. Commonly the adsorption of molecules is detected by determining a mass variation per unit area by measuring a change in frequency of a quartz crystal resonator of the QCM. The resonance may be shifted by the addition of a small mass due adsorption at the surface of the acoustic resonator. The QCM may be used in different fluid environments such as vacuum, gases or liquids. Frequency measurements of the quartz crystal resonator may be made to high precision and hence, mass densities down to a level of 1 ng/cm$^2$ may be detected. In addition to or as an alternative to measuring the frequency, the dissipation, i.e. the quantity related to the energy damping in the resonator, may be measured as a resonator response.

The frequency and/or dissipation response of a resonator is, however, complex and may be influenced by many parameters such as the intrinsic material properties of the resonator, the complex relationship between an adsorption event and the resonator as well as by a change to the surrounding media of the resonator. Hence, there is a need for, not only improved detection sensitivity of mechanical resonators, but also improved reliability and robustness of the mechanical resonators.

SUMMARY OF THE INVENTION

In view of the above, it is an object of the present invention to provide an improved validation of a resonator. The reliability and robustness at which the resonator may be used for sensing applications are thereby improved. An improved method for calibrating the resonator is further provided.

According to a first aspect of the invention a method of validating a resonator is provided. The method comprises: providing a first set of resonator responses of the resonator pertaining to a first validation fluid, contacting the resonator and a second validation fluid, wherein the first and the second validation fluids have different viscoelastic properties, obtaining in contact with the second validation fluid a second set of resonator responses of the resonator, wherein each resonator response pertains to a resonance frequency or a dissipation response of the resonator, validating the resonator by comparing a first and a second value, the first value being obtained from at least one resonator response of the first set of resonator responses and at least one resonator response from the second set of resonator responses, the second value being based on a relationship between frequency or dissipation responses of the resonator and a function of the viscoelastic properties of the first and the second validation fluid.

The wording fluid is to be understood as a substance that continually deforms (flows) under an applied force. Hence, fluids are a subset of the phases of matter and include, for example, liquids and gases. The wording validation fluid may be understood as a fluid which is used for validating the resonator. The resonator may be contacted with the validation fluid. As a non-limiting example, the viscoelastic properties of the validation fluid may be known by measurements or from theoretical estimates. The viscoelastic properties of the validation fluid may alternatively be unknown. It may suffice that it is known that a first and a second validation fluid have different viscoelastic properties. Non-limiting examples of viscoelastic properties are density and viscosity. Entities such as ionic strength, IS, and concentration, [el], may be further related to the viscoelastic properties such that they may, for example, be used in their place to parameterize functions or relationships. The viscoelastic properties of the validation fluid may be determined or predetermined by a theoretically derived value or values and/or be provided, for example, by a manufacturer of the validation fluid. Alternatively the method may further comprise determining the viscoelastic properties of the validation fluid as will be discussed below.

The wording first set of resonator responses should be understood as comprising one resonator response or a plurality of resonator responses. The first set of resonator responses may comprise a fundamental resonance mode of the resonator and/or the overtones of the fundamental resonance mode of the resonator.

The wording resonator responses are to be understood as the fundamental resonance frequency of the resonator and/or the frequency of overtones of the fundamental resonance frequency. The resonator responses may alternatively be understood as the dissipation of the resonator at the fundamental resonance frequency of the resonator and/or at the frequencies of the overtones of the fundamental resonance frequency. It should be noted that the dissipation, i.e. the resonance bandwidth, relates to the damping of the resonator which relates to the shear-acoustic impedance of the fluid surrounding the resonator. A resonator response of the resonator may be understood as a resonant response of the resonator.

The wording viscoelastic properties should be construed as properties of materials which exhibit both viscous and elastic characteristics when undergoing deformation. The viscoelastic properties of a fluid may be defined by the density, $\rho$, and the viscosity, $\eta$ of the fluid.

A simple and reliable validation method is provided. An advantage of the method is that it is possible to validate a resonator response. In other words, the method allows for determining if a resonator response is to be considered reliable, for example, for further measurements. Spurious effects and unpredictable results may thereby be mitigated by using the validation method. The validation method, moreover, allows for an efficient calibration of the resonator response of the resonator. The wording calibration may be construed as a process of finding a relationship between two quantities, i.e. between a validated resonator response and resonator response corresponding to an unknown fluid. Hence, the validation method allows for more sensitive and accurate measurements using the resonator in fluids having unknown viscoelastic properties.

The act of providing the first set of resonator responses may comprise providing a predetermined first set of resonator responses.

A simple and effective method for validation is therefore provided in that only one act of contacting the resonator to a validation fluid, i.e. to the second validation fluid, is needed. The predetermined first set of resonator responses may be determined or predetermined by a theoretically derived value or values and/or be provided, for example, by a manufacturer of the resonator.

The act of providing the first set of resonator responses may comprise contacting the resonator and the first validation fluid and obtaining in contact with the first validation fluid the first set of resonator responses of the resonator.

An advantage being that there is no need for predetermined knowledge of the first set of resonator responses. In other words, by contacting and measuring resonator responses in two validation fluids having different viscoelastic properties the validity in the resonator response may be determined. Hence, it is thereby possible to determine which resonator responses of the set of resonator responses may be considered reliable for further measurements. An improved control of experimental parameters such as temperature, arrangement of the resonator or the contacting procedure of the resonator, may be achieved by contacting the resonator with the first and the second fluid in a similar manner. An improved accuracy in determining the resonator responses may thereby be provided. A simple and reliable validation method is further provided.

The relationship between resonator responses of the resonator and a function of the viscoelastic properties of the first and second validation fluid may be a linear relationship. An effective and simple-to-use validation procedure is thereby provided.

The first validation fluid may be a baseline solution, e.g. a buffer solution not comprising added salt.

The linear relationship may be given by the resonator response being proportional to $((\rho_2\eta_2)^{1/2}-(\rho_1\eta_1)^{1/2})$, wherein the $\rho_2$ is the density of the second validation fluid, $\eta_2$ is the viscosity of the second validation fluid, the $\rho_1$ is the density of the baseline solution and $\eta_1$ is the viscosity of the baseline solution. As described above, baseline solution may refer to the first validation fluid.

The resonator response being proportional to $((\rho_2\eta_2)^{1/2}-(\rho_1\eta_1)^{1/2})$ may be given by a proportionality factor, the proportionality factor being $$-K_Q \times \sqrt{n} = -\frac{f_0^{3/2}}{\sqrt{\pi\rho_Q\mu_Q}} \times \sqrt{n},$$

wherein $f_0$ is the fundamental resonant frequency, $\rho_Q$ is the density of the resonator, $\mu_Q$ is the shear modulus of the resonator, and $n>1$ is the number of the overtone of the fundamental mode; by setting $n=1$, the correct expression is also obtained for the fundamental mode.

The resonator may be a quartz microbalance with dissipation monitoring.

The resonator may comprise a non-adsorbing surface. Adhesion of compounds within the first and/or second validation fluid may thereby be mitigated.

The non-adsorbing surface may comprise a gold-coated quartz crystal.

The function of the viscoelastic properties of the first and second validation fluid may be defined based on the concentration or the ionic strength of the first and/or second validation fluid. An effective validation of the resonator may thereby be provided based on concentration or the ionic strength of the first and/or second validation fluid. Knowledge of the density and/or viscosity of the first and/or second validation fluid is thereby not required for the validation of the resonator.

The concentration may be defined by the concentration of added salt to the first and/or second validation fluid.

The resonator response may pertain to a resonance frequency or a dissipation of the fundamental mode of the resonator or of an overtone of the fundamental mode.

Hence, a plurality of resonator responses may be validated and used for further measurements. The resonator responses may thereby be efficiently calibrated by the method.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

FIGS. 2a and 2b illustrate a resonator in contact with two different validation fluids.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
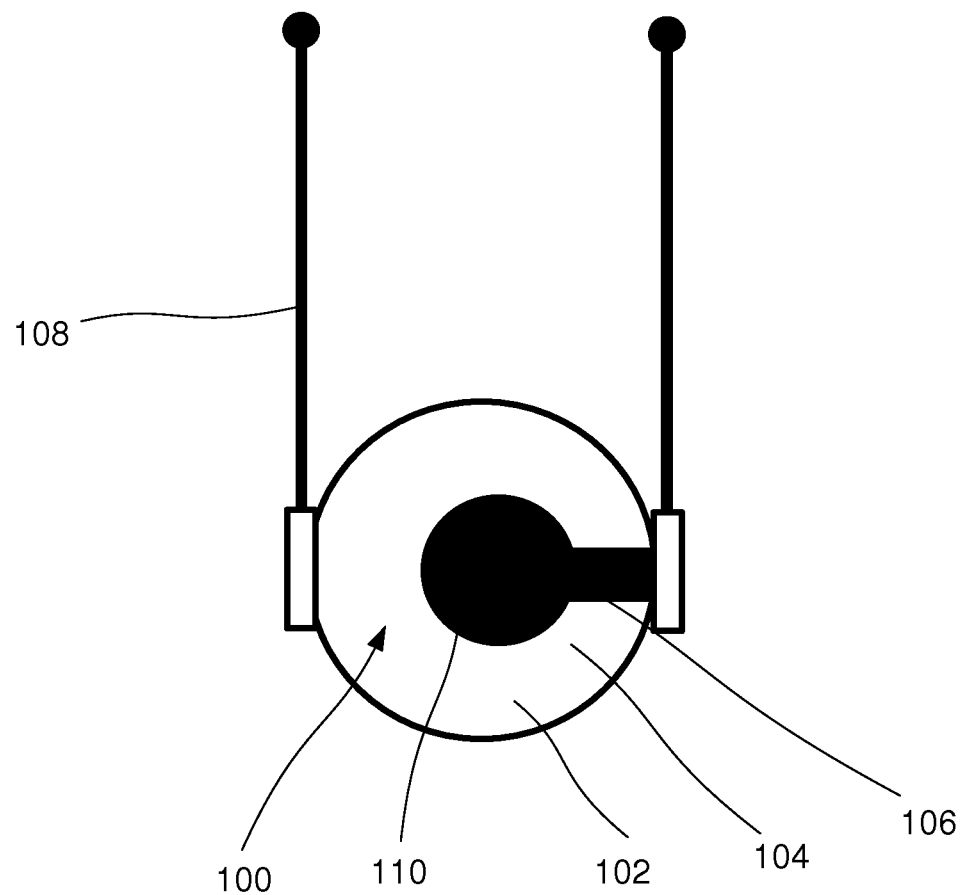
FIG. 1 illustrates a resonator according to prior art.

FIG. 1 illustrates a resonator 100 according to prior art.

The resonator 100 is a quartz crystal microbalance, QCM. The QCM is generally a mass-loading sensor. The QCM comprises a quartz crystal 102. The quartz crystal 102 may be cut in the so-called "AT orientation", typically forming a disk or chip 104. The surfaces of the chip in a non-limiting embodiment are patterned with electrodes 106, which serve two purposes: to drive the crystal into oscillation or resonance electrically via a pair of external electrodes 108 and to provide a sensor surface 110 which typically is contacted to a fluid being investigated. Molecular binding may take place on the sensor surface. It should be noted that the most pronounced oscillation or resonance mode is commonly the shear mode, i.e. displacement along the chip surface 104. The resonator 100 further comprises a surface, not shown, which is typically not in contact with the fluid when the resonator is in operation and is commonly used to provide, for example, contact areas for external electrodes 108.

The resonance frequency of the resonator 100 decreases upon adsorption of molecules onto the sensor surface. As first derived by Sauerbrey, in Zeitschrift für Physik, 1959, 155, 206, the frequency change (Δf) is then proportional to the mass (Δm) of the adsorbed molecules, as expressed in the Sauerbrey equation, where $f_0$ is the resonance frequency, $\rho_Q$ and $\mu_Q$ are the density and shear modulus of a quartz crystal, respectively, and A is the piezoelectrically active crystal area.

$$\Delta f = -\frac{2 f_0^2}{A \sqrt{\rho_Q \mu_Q}} \times \Delta m$$

Stockbridge, in Vacuum Microbalance Techniques (Plenum, N.Y., 1966, Vol. 5, p. 147), went one step further demonstrating that the frequency changes upon adsorption of gases on an oscillating sensor depend on the density and viscosity of the gas itself, that must be treated as a viscoelastic fluid. After the demonstration of the experimental feasibility of working with a liquid, Kanazawa and Gordon, in Anal. Chim. Acta, 1985, 175, 99, derived for the fundamental resonant mode a general relationship that relates the frequency shift (compared to operating in vacuum) Δf of an oscillator in contact with a liquid to its viscoelastic properties through the viscoelastic properties (density, $\rho_Q$, and shear modulus, $\mu_Q$) of the quartz oscillator and its fundamental resonant frequency, $f_0$:

$$\Delta f = -\frac{f_0^{3/2}}{\sqrt{\pi \rho_Q \mu_Q}} \times \left(\sqrt{\rho_2 \eta_2} - \sqrt{\rho_1 \eta_1}\right) \qquad \text{Eq. 1}$$

Eq. 1 is written in a general form for a frequency shift, i.e., a difference in the resonant frequency between a second fluid with density, $\rho_2$, and viscosity, $\eta_2$, and a first fluid with density, pi, and viscosity, $\eta_1$. In a special case considered by Kanazawa and Gordon, the first fluid was assumed to be vacuum with density-viscosity product, $\rho_1 \eta_1$, set to zero.

For an overtone number n>1, the frequency response is given by:

$$\Delta f = -\frac{f_0^{3/2}}{\sqrt{\pi \rho_Q \mu_Q}} \times \sqrt{n} \times \left(\sqrt{\rho_2 \eta_2} - \sqrt{\rho_1 \eta_1}\right) \qquad \text{Eq. 2}$$

The frequency response for the fundamental mode and the overtones of an oscillator in a fluid therefore depend not only on the mass of the adsorbed molecules per unit area, but also on the bulk properties of the fluid environment. For resonators that are non-adsorbing for the fluid in contact with which they are operated, the responses are dominated by the viscoelastic properties of the fluid.

In the following, a robust and easy-to-use method will be described to allow for a validation of the resonator and to allow for a correlation of effects of the fluid environment to the frequency and/or dissipation response of the resonator. The validation method, moreover, allows for an efficient calibration of the resonator response of the resonator.

In the following, a method for validating a resonator 200 will be discussed with reference to FIGS. 2-4. FIGS. 2a-2b illustrate a resonator 200 in contact with two different validation fluids 202, 204 and FIGS. 3a-3d illustrate resonator responses 208 for the two validation fluids 202, 204. The resonator 200 comprises a surface 203 that typically is not exposed to a fluid when the resonator 200 is in operation, is used to make electrical connections, and is considered as freely-oscillating in modelling the resonator.

The resonator 200 further comprises a sensor surface 205 which is in contact with the validation fluids 202, 204. The sensor surface 205 may be construed as a surface onto which adsorption of adsorbates is reduced. An improved sensing of the viscoelastic properties of the validation fluid 202, 204 may thereby be achieved.

Figure 4:
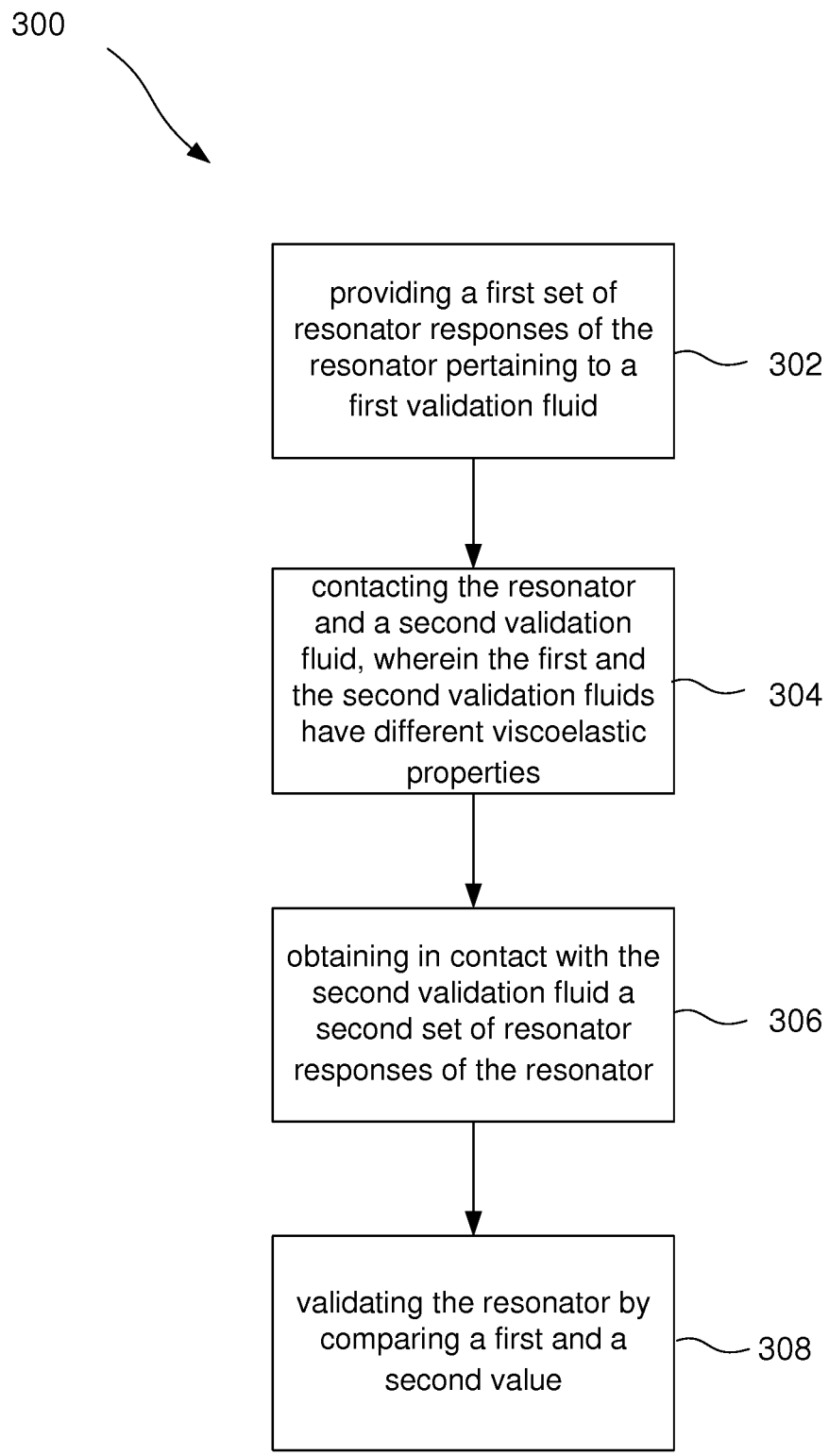
FIG. 4 illustrates a flow chart illustrating a method for validating a resonator.

FIG. 4 illustrates a flow chart illustrating a method 300 for validating the resonator 200. The method 300 comprises providing 302 a first set of resonator responses 206 of the resonator 200 pertaining to the first validation fluid 202. The act of providing the first set of resonator responses may comprise (FIG. 2a) contacting the resonator 200 and the first validation fluid 202 and obtaining in contact with the first validation fluid 202 the first set of resonator responses 206 (FIG. 2c).

In this non-limiting example, the first validation fluid ($F_1$ in FIG. 2c) is an aqueous Tris-EDTA (TE) buffer at constant pH, but may in other embodiment comprise other liquids or gases. In this non-limiting example, the TE buffer represents a baseline solution, to illustrate the practical advantages of choosing a baseline solution as the first validation fluid.

Figure 2C:
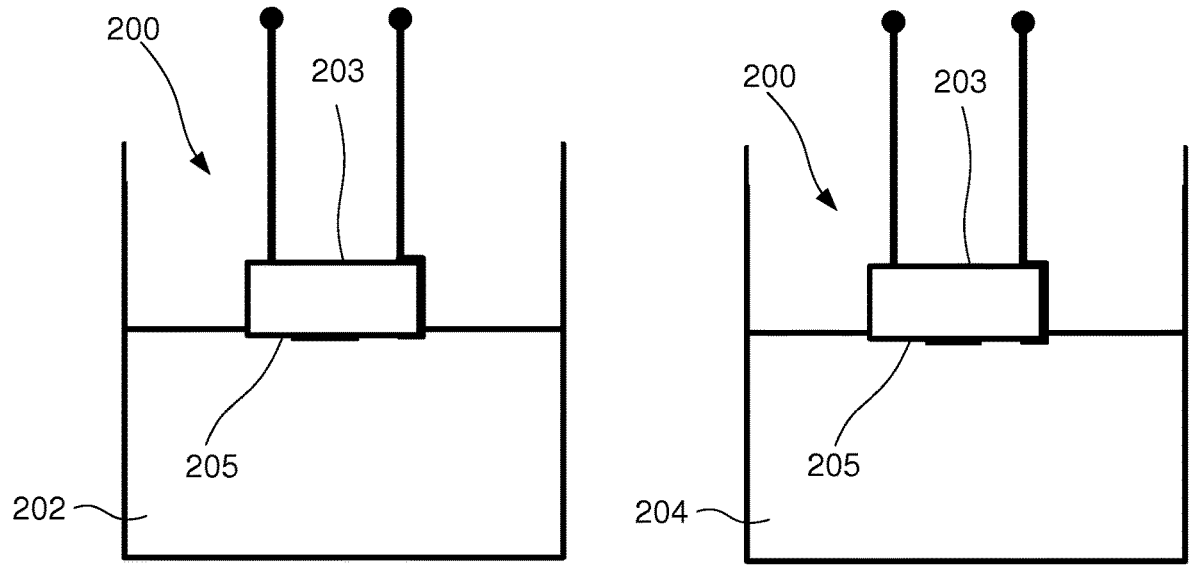
FIG. 2c illustrates resonator responses for different validation fluids.
Figure 2C:
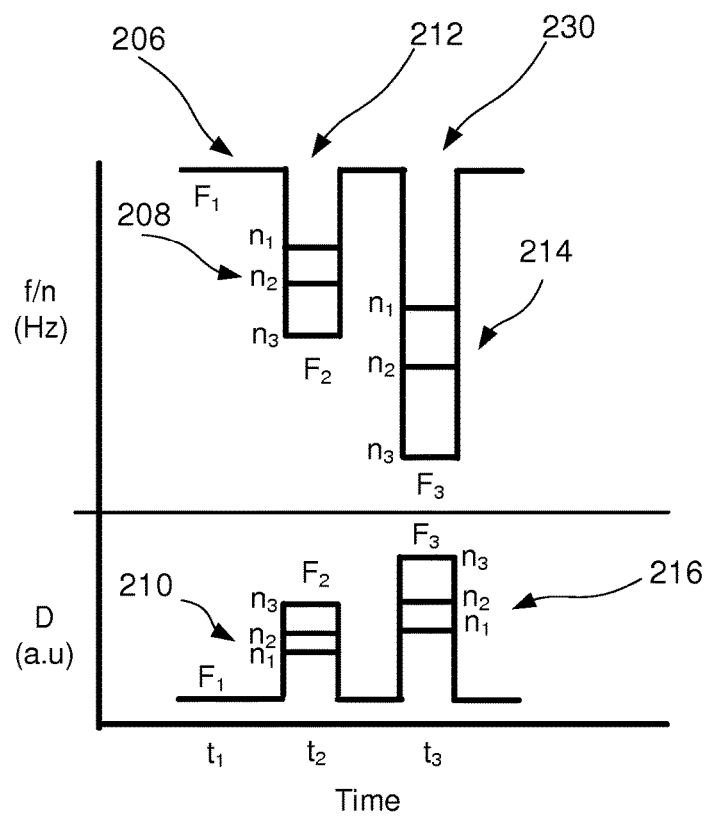

The first set of resonator responses 206 comprises frequency, f and/or dissipation, D, responses as obtained by the resonator 200 when in contact with the first validation fluid 202, see FIG. 2c where the frequency response, after division by the overtone number, f=f/n, and the dissipation are plotted as function of time, in this non-limiting example, for three overtones $n_1$, $n_2$ and $n_3$. The time, $t_1$, illustrates in FIG. 2c the period when the resonator 200 is in contact with the first validation fluid 202. The set of responses pertaining (302 in FIG. 4) to the first validation fluid 202 is indicated by $F_1$ in FIG. 2c.

Next, the method 300 comprises the act of contacting 304 the resonator 200 and a second validation fluid 204, see FIG. 2b.

A second set of resonator responses 212 of the resonator are thereafter obtained 306 in contact with the second validation fluid 204. The resonator response pertains to resonance frequency 208 or dissipation 210 of the resonator, as for the first validation fluid 202. The time, $t_2$, illustrates the period when the resonator 200 is in contact with the second validation fluid 204.

The set of responses 212 obtained (306 in FIG. 4) in contact with the second validation fluid 204 is indicated by $F_2$ in FIG. 2c. The first 202 and the second 204 validation fluids have different viscoelastic properties. FIG. 2c illustrates that the frequency 208 and dissipation 210 responses shift in the second validation fluid, $F_2$, relative to the responses in the first validation fluid (baseline solution), $F_1$. Furthermore, the magnitude of the shift varies for the different overtones. Information on which, if any, of the responses 212 may be considered to be valid for the resonator 200 may not, however, be generally deduced in a reliable manner from FIG. 2c.

The resonator validation procedure 308 (FIG. 4) is based on comparing a first and a second value. In the following non-limiting example, the frequency response 208 (FIG. 2c) will be discussed.

The first value for the comparison 308 of the validation procedure 300 can be obtained, for a specific overtone n, as the difference, $\Delta f$, between the frequency responses of the resonator in the second validation fluid ($F_2$ in FIG. 2c) and the first validation fluid ($F_1$ in FIG. 2c). This first value can be compared to a second value based on Eq. 2 following procedures illustrated in FIG. 3 as non-limiting examples.

FIG. 3 can be interpreted by using a modified version of Eq. 2. Specifically, by introducing a general notation for the difference in viscoelastic properties between two fluids ($\sqrt{\rho_2\eta_2}-\sqrt{\rho_1\eta_1}$) as $$L_{\sqrt{\rho_L\eta_L}},$$

and using the constant $K_Q$ to express the crystal dependent parameters of the resonator 200, i.e. the fundamental frequency, density and shear modulus of the crystal, one obtains from Eq. 2:

$$\Delta f = -K_Q \times \sqrt{n} \times L_{\sqrt{\rho_L\eta_L}} \qquad \text{Eq. 3}$$

Eq. 3 therefore corresponds to Eq. 2 re-arranged to represent a three-term linear relationship, where the first term, $K_Q$, depends only on the viscoelastic crystal parameters; the second term is the overtone dependence; and the third term reflects the viscoelastic properties of the validation fluids 202 and 204. For the difference between the two validation fluids $F_2$ and $F_1$ ($\sqrt{\rho_2\eta_2}-\sqrt{\rho_1\eta_1}$) in FIG. 2, the third term can be denoted as $L_2$. In FIG. 3, the shift, $\Delta f$, in the frequency response between the second and first validation fluids, or a value derived from $\Delta f$, is plotted against $L_2$.

Figure 3A:
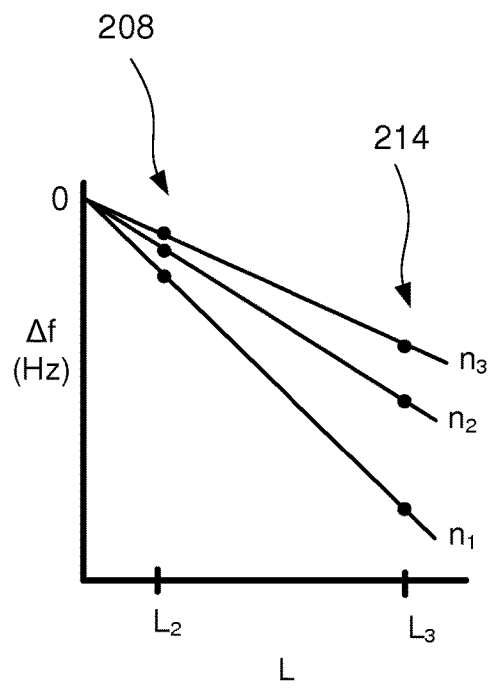
FIG. 3 illustrates comparison of resonator responses for the different validation fluids.

As a non-limiting example, FIG. 3a illustrates the linear relationship of Eq. 3 for the frequency response of the resonator 200. The frequency shifts 208 between the second and first validation fluids, pertaining to overtones $n_1$, $n_2$ and $n_3$, are plotted against $L_2$.

Based on the information obtained from the previous actions of the method 300, the resonator 200 is validated 308, see the method in FIG. 4, by comparing a first 218 and a second value 220 as will be discussed and exemplified below. In each example, the first value 218 is obtained from at least one frequency response in the first validation fluid, $F_1$, and at least one frequency response in the second validation fluid, $F_2$, see FIG. 2c.

Figure 3B:
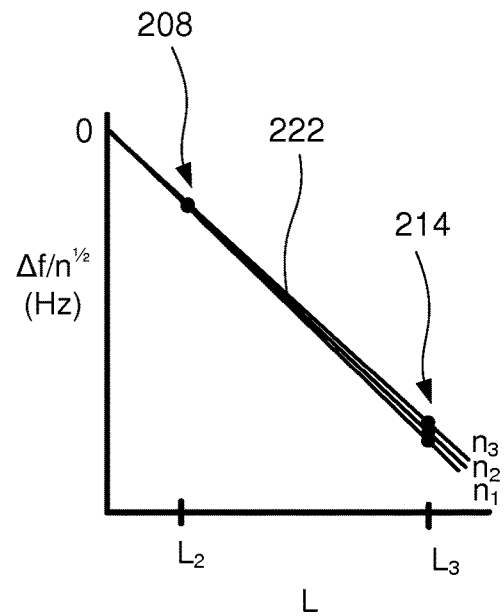

Based on Eq. 3, the overtone-independent $K_Q$ values 222 may be obtained for overtones $n_1$, $n_2$ and $n_3$, as slopes of the lines plotted through the origin and $\Delta f/\sqrt{n}$ values corresponding to $L_2$, see FIG. 3b. According to one embodiment, at least one of the values 222 may be chosen as a first value 218. A second value, not shown, may be given by a predicted $K_Q$ given by Eqs. 2 and 3. The resonator 200 may be validated by comparing the first and the second value.

Alternatively to or in combination with individual slopes as a first value 218, the different slopes may be averaged together to form a first value 218 to be compared with the second value, given by a predicted $K_Q$ given by Eqs. 2 and 3.

The $K_Q$ values are found by linear fitting through the origin and all the data points 208 in FIG. 3b. A further result is, therefore, that it is possible, by using the method 300, to determine the crystal parameters of a validated resonator 200 when working with oscillating sensors of unknown shear modulus and density, demonstrating the universality of the method 300.

Figure 3C:
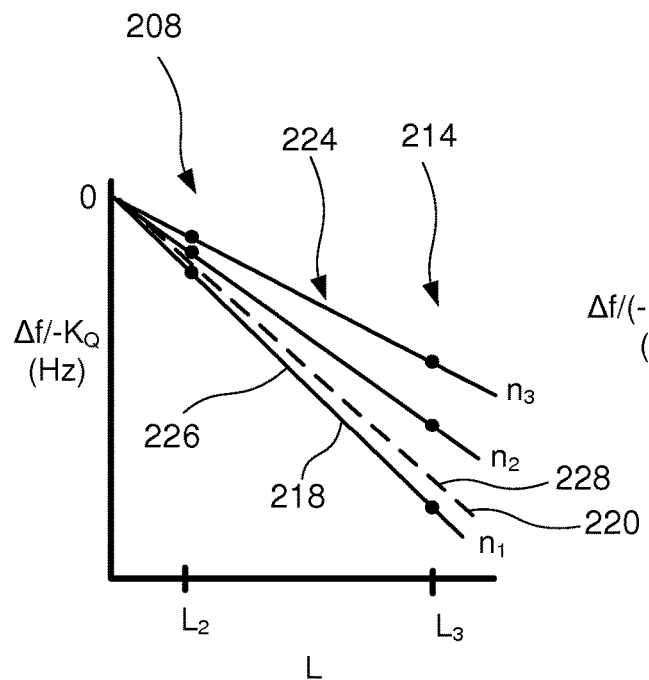

The response of the resonator may be validated, for any of the overtones $n_1$, $n_2$ and $n_3$ by dividing $\Delta f$ by a predicted $K_Q$, where $K_Q$ may be predetermined or derived from Eqs. 2 and 3 and known crystal dependent parameters of the resonator 200, i.e. the fundamental frequency, density and shear modulus of the crystal. FIG. 3c illustrates the plot obtained after dividing $\Delta f$ by $K_Q$. A first value 218 may be obtained as the slope of a line 224 for each overtone number going through the origin and the data points 208.

The resonator may then be validated by comparing the first value 218 to a second value 220 given by, $\sqrt{n_i}$, where $n_i$ is the overtone number, which is based on a relationship (Eq. 3) between the resonator frequency response and a function of the viscoelastic properties of the first and the second validation fluid. In other words, lines with slope different from $\sqrt{n_i}$, indicate that the corresponding overtones are not reliable, as exemplified by line 226 which is deviating in slope from the predicted value 228 of $\sqrt{n_1}$. Thus the overtone $n_1$ is by the validation of the resonator 200 found not to be behaving according to the viscoelastic model of Eq. 3. Based on the information provided by the method 300, the response of the overtone m may, however, be calibrated and, therefore, be used for further measurements with the resonator 200.

The validation described above is, in other words, based on determining if, for a fixed overtone $n_i$ the measured frequency response is within a tolerance from a linear relationship given by the relationship between frequency response and the viscoelastic properties of the first and the second validation fluid.

Alternatively, the spacing between different overtones within a set of resonator responses 208, for a fixed $$L_{\sqrt{\rho_L \eta_L}}$$

may be used for validating the resonator, i.e. by determining if the first value provided by the separation between the resonator responses agrees with the second value provided by the separations given by the relationship between frequency response and the viscoelastic properties of the first and the second validation fluid, i.e. according to Eq. 3.

Figure 3D:
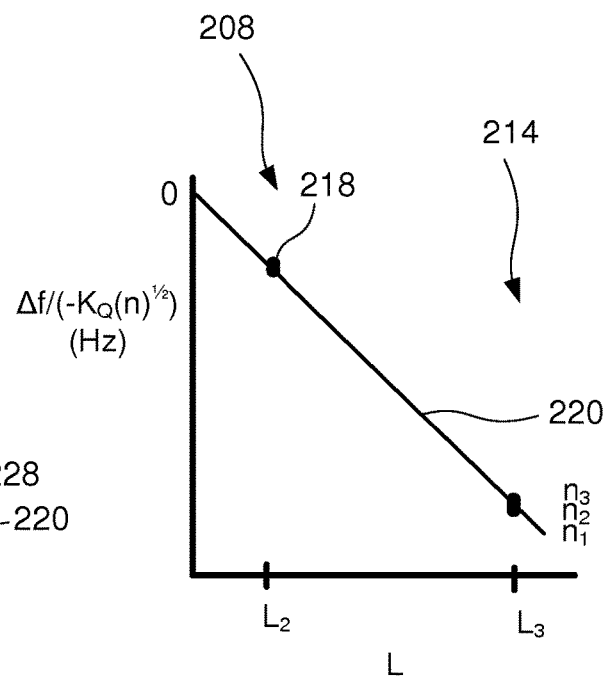

To this end, the resonator may be validated for the frequency response at any overtone by dividing $\Delta f$ by the product of $\sqrt{n}$ and the predicted $K_Q$, see FIG. 3d, for which any deviation of a line passing through the origin and data points 208 from a single line of slope unity, not shown, indicates that the response of the resonator deviates from the desired behaviour.

The person skilled in the art realizes that the resonator responses 208 may comprise more or fewer overtones that the $n_1$, $n_2$ and $n_3$ exemplified above, including cases of a single overtone or the fundamental frequency.

The person skilled in the art further realizes that by using three or more validation fluids, sets of resonator responses in addition to 208 illustrated in the above examples can be obtained and used in the validation procedure.

A non-limiting example of using a third validation fluid, $F_3$, having viscoelastic properties different from those of the first and second validation fluids and, thereby, $$L_{\sqrt{\rho_L \eta_L}}$$

value denoted as $L_3 = (\sqrt{\rho_3 \eta_3} - \sqrt{\rho_1 \eta_1})$, is illustrated by the resonator responses 230 in FIG. 2c. The time, $t_3$, illustrates in FIG. 2c the period when the resonator 200 is in contact with the third validation fluid.

The responses 214 pertaining to the third validation fluid are plotted against $L_3$ in FIGS. 3a-3d. The person skilled in the art realizes how the validation procedures exemplified above for the set of responses 208 in two validation fluids can be expanded to include the additional set of responses 214.

In the above discussion, the resonator response pertains to resonance frequencies of the resonator. The person skilled in the art realizes that the resonator response can also pertain to dissipation of the resonator. To this end, the resonator may be a quartz microbalance with dissipation monitoring as illustrated by the dissipation responses 210 in FIG. 2c.

In analogy, with the above discussion for the frequency shifts, the dissipation shifts $\Delta D$ can be expressed as $$\Delta D = \frac{2\sqrt{f_0}}{\sqrt{\pi \rho_Q \mu_Q}} \times \frac{1}{\sqrt{n}} \times L_{\sqrt{\eta_L \rho_L}} \quad \text{Eq. 4}$$

Since the first term of Eq. 4 contains only the parameters pertaining to the crystal, one can express it in terms of $K_Q$ and simplify Eq. 4 as follows:

$$\Delta D = \frac{2K_Q}{f_0} \times \frac{1}{\sqrt{n}} \times L_{\sqrt{\eta_L \rho_L}} \quad \text{Eq. 5}$$

Therefore, for the dissipation a three-term linear equation describing the resonator response may be used, and the mathematical treatment analogous to that carried out for the frequency response may be used. In other words, measurements of dissipation may be used for validating the resonator as will be exemplified below.

The act of providing the first set of resonator responses may comprise providing a predetermined first set of resonator responses, which may be determined or predetermined by a theoretically derived value or values and/or be provided, for example, by a manufacturer of the resonator. A simple and effective method for validation is therefore provided in that only one on act of contacting the resonator to a validation fluid, i.e. to the second validation fluid, is needed.

Alternatively, the act of providing the first set of resonator responses comprises contacting the resonator and the first validation fluid and obtaining in contact with the first validation fluid the first set of resonant responses of the resonator; an advantage of this approach being that there is no need for predetermined knowledge of the first set of resonator responses.

The above described mathematical treatment relies on the knowledge of the bulk properties of the viscoelastic properties of the fluid, e.g. density and viscosity. In other words, the viscoelastic properties of each validation fluid may be predetermined or determined experimentally using techniques known to the person skilled in the art.

To determine the viscoelastic properties may, however, be experimentally demanding or even, in some cases, unfeasible, since these parameters might be neither measurable nor available.

The function of the viscoelastic properties, e.g.

$$L_{\sqrt{\eta_L \rho_L}}$$

of the validation fluid may, however, be defined based on the concentration or the ionic strength of the first and/or second validation fluid as will be exemplified below. This is advantageous, as concentrations or ionic strengths are commonly known parameters for fluids.

A correlation between the frequency and/or dissipation response of the resonator with the concentration or ionic strength of the validation fluids is therefore obtainable.

A linear relationship may further be used to translate between parameterization based on density and viscosity and parameterizations based on concentration or ionic strength.

In a simple non-limiting embodiment, the concentration used to parameterize the second and any additional validation fluids may be defined by the concentration of salt added to the first validation fluid (baseline solution), as exemplified below.

EXAMPLES

The following descriptions of experiments are intended to be examples of the embodiments disclosed herein, and are not intended to be limiting. In the following, different experimental realizations for validating a resonator are given.

Materials

NaCl (Acros Organics), $MgCl_2$ (Fisher Sientific), $CaCl_2$) (Sigma Aldrich), Ethylenediaminetetraacetic acid (EDTA, Sigma Aldrich) and Tris(hydroxymethyl)aminomethane hydrochloride (Tris-HCl, Sigma Aldrich) were used to prepare the salt in Tris-EDTA (TE) buffer solutions. Stock solutions (4M) of each salt were prepared in milliQ water and stored in the fridge at 4° C. for a maximum period of 1 month. Note: the dissolution of $CaCl_2$) in milliQ water is exothermic. 10×TE buffer (100 mM Tris-HCl and 10 mM EDTA) was prepared mixing proper volumes of the stock solution (215 mM) of EDTA, prepared at pH=8 by addition of NaOH 6M, and the stock solution (1M) of Tris-HCl (pH 7.5). The obtained 10×TE buffer was filtered under vacuum using a 0.2 µM pore size filter (from Nalgene). The sterilized buffer was stored in the fridge at 4° C. for a maximum period of 1 month.

Preparation of Salt-TE Buffer Solutions

To prepare the salt-TE buffers, an appropriate volume of the salt stock solution was mixed with the appropriate volume of the 10× filter-sterilized TE buffer and added with milliQ water up to the desired final volume. Buffers denoted NaCl-TE; $MgCl_2$-TE and $CaCl_2$)-TE consisted of variable volumes of stock solution of the respective salt in 1×TE buffer. The pH has been adjusted for each solution using the minimal required amount of NaOH 6M. For the monovalent salt, TE-buffers with concentrations of 0.3M, 0.75M, 0.9M, 1.25M and 3.6M were prepared starting from a 4M NaCl stock solution. For the divalent salts, TE-buffers with concentrations of 0.1M, 0.25M, 0.3M, 0.42M, 0.75M, 1.25M and 3.6M were prepared starting from 4M $MgCl_2$ and $CaCl_2$) stock solutions.

Quartz Crystal Microbalance with Dissipation Monitoring

Quartz crystal microbalance with dissipation monitoring (QCM-D) measures the changes in the fundamental resonant frequency (t) of a quartz crystal oscillating in a liquid in contact with it, as well as the dissipation factor (D) corresponding to the dampening of the oscillation due to the viscoelasticity of the liquid in contact with the sensing crystal. In this work we have studied the changes in the frequency ($\Delta f$) and dissipation ($\Delta D$) of a non-adsorbing gold-coated AT-cut quartz crystal sensor upon sequential exposure to solutions of TE buffer, monovalent (sodium chloride, NaCl), or divalent salts (calcium chloride, $CaCl_2$), and magnesium chloride, $MgCl_2$) in TE buffer at constant pH value (pH=7.35±0.04).

The QCM-D measurements were performed on a Q-Sense E1 system (Biolin Scientific, Vastra Frölunda, Sweden). AT-cut quartz crystals covered with gold were purchased from Q-Sense. They were used after cleaning in an oxygen-plasma cleaner for 30 s at medium RF power, immersion in ultrapure ethanol (Carlo Erba) for a time less than 5 minutes and then insertion in the QCM-D cell without any drying. After positioning of the sensor, the back side has been gently wiped dry with a lint-free tissue.

Frequency, f, and dissipation, D, responses were measured at the fundamental (4.95 MHz) frequency and at its 6 overtones (n=3, 5, 7, 9, 11, 13), corresponding to resonance frequencies of 15, 25, . . . , 65 MHz. In the specific instrument used in this work, the Q-Sense E1, the frequency values read in the Q-Soft software ($f_{Q-Soft}$) in real time are shown as divided by the overtone number n: therefore $f_{Q-Soft}=f/n$. The dissipation values read from the Q-Soft software, in contrast, have not been subjected to any overtone normalization, i.e $D_{Q-Soft}=D$.

Measurements were done with a flow rate of 0.3 ml/min at a constant temperature of 20° C. (within <1° C. from the room temperature). The baseline was recorded after exposure of the crystal to TE-buffer (1×, pH 7.30) for a period of around 30-60 minutes to allow for stability. The null frequency measured for all the overtones corresponds to the baseline and it will indicated as $f_{bl}$. The salt-TE solutions stored at 4° C. were injected in the QCM-D flow module only after having reached room temperature (20° C.), mainly to avoid formation of bubbles in the capillary tubings. The salt-TE solutions (denoted hereafter as "el", for "electrolyte") were either injected going from the lowest to the highest concentration or randomly, and the frequency shift ($\Delta f_{el}$) was found to be independent on the injection sequence over three different sets of experiments. After injection of any salt-TE solution, the same solution was left flowing over the crystal until a stable frequency value was reached, and then the baseline was recovered by injection of TE buffer at the same temperature and flow rate. The frequency difference (or frequency shift) we will refer to from now on, is therefore equal to the difference $\Delta f_{el}=f_{el}-f_{bl}$. ($\Delta f_{el}$ is denoted hereafter as $\Delta f$, for brevity). Analogous considerations and terminology apply to the dissipation changes.

In other words, the first validation fluid is in this experimental setup a baseline solution, i.e. a TE buffer solution not comprising any additional salt.

In the equations reported, $\Delta f$ corresponds to $n \times \Delta f_{Q-Soft}$. In the figures, changes in the frequency response are presented either as read from the QCM-D instrument ($\Delta f_{Q-Soft}$) or multiplied by the overtone number, i.e. $\Delta f$. The frequency shift values (either $\Delta f$ or $\Delta f_{Q-Soft}$) are negative values.

In the case of the dissipation data, the values read in real time from the Q-Sense QCM ($D_{Q-Soft}$) are not divided by the corresponding overtone number, therefore for dissipation changes in the equation, $\Delta D$ corresponds to $\Delta D_{Q-Soft}$.

Measurement of the Frequency and Dissipation Response Over Time

Figure 5:
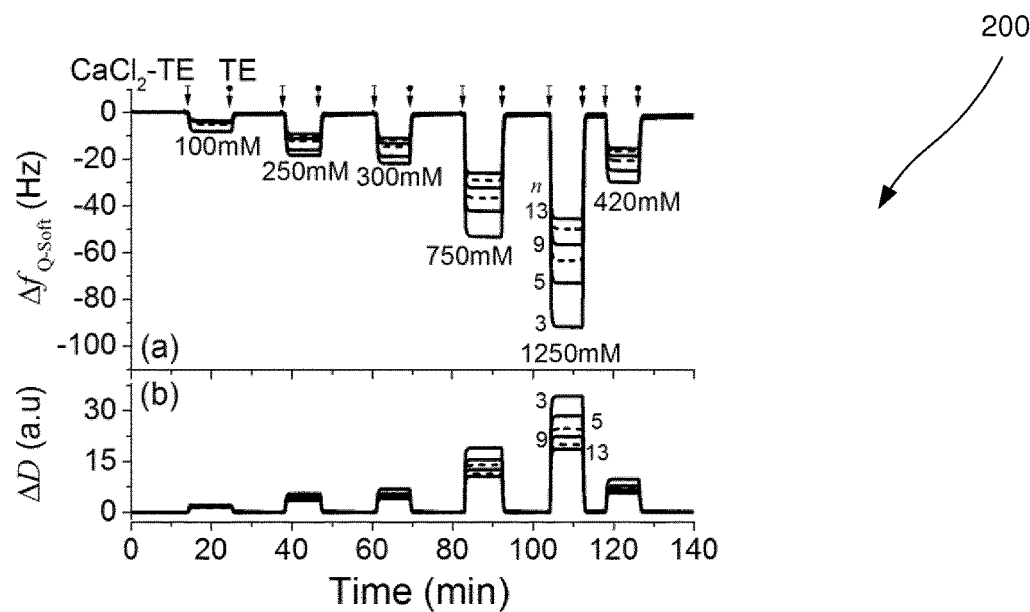
FIG. 5 illustrates resonator responses for different validation fluids.

How the frequency (t) and energy dissipation (D) change as the consequence of the exposure of a gold-coated crystal to buffer solutions containing different concentration of electrolytes is shown in FIG. 5 in the case of $CaCl_2$)-TE. For NaCl-TE and $MgCl_2$-TE the responses are qualitatively similar, not shown. For each concentration, three independent sets of experiments have been carried out. In FIG. 5, the frequency (f) and dissipation (D) responses are shown relative to their respective values in the TE buffer baseline solution, i.e., the first validation fluid, so the vertical scales are labeled in terms of the shifts in frequency, $\Delta f_{Q\text{-}Soft}$, and dissipation, $\Delta D$.

Figure 6:
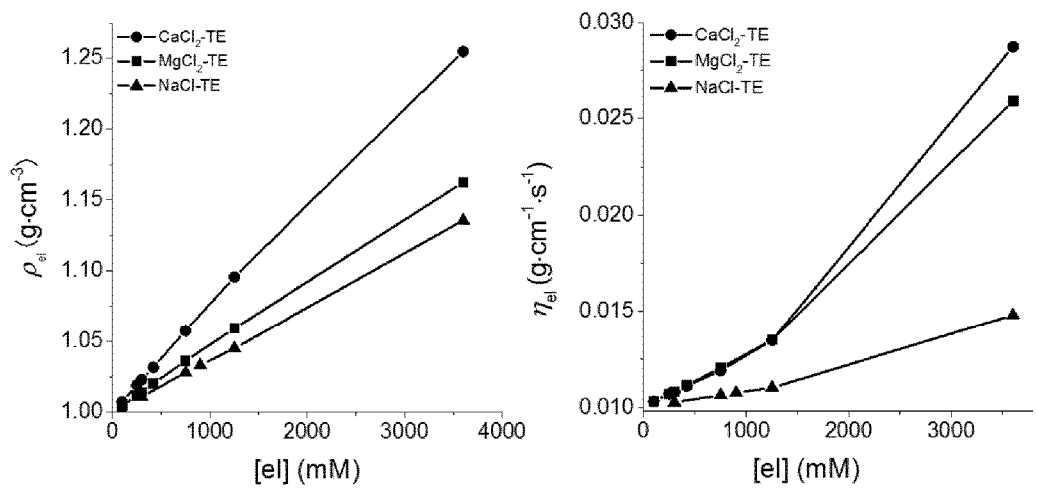
FIG. 6 illustrates the relation between viscoelastic parameters and concentration of fluids comprising different buffer salt solutions.

FIG. 6a illustrates that the density, $\rho_{el}$, is a linear function of the concentration, [el], across the entire range of electrolyte concentrations used in FIGS. 5-11, with proportionality constants obtained from the linear fits of the experimental data of $7.05 \times 10^{-5}$ g/mol, $4.51 \times 10^{-5}$ g/mol and $3.79 \times 10^{-5}$ g/mol for $CaCl_2$-TE, $MgCl_2$-TE and NaCl-TE, respectively.

FIG. 6b illustrates the relationship between viscosity, $\eta_{el}$, and concentration, [el]. For all the salts used in FIGS. 5-11, the viscosity scales linearly with the increase in concentration up to a concentration value of 1250 mM. At higher concentrations, there is a deviation from linearity. This behavior had been previously reported in the literature for aqueous solutions of electrolytes.

As illustrated in FIG. 5, the changes of frequency and dissipation in the time domain may be read from the Q-Sense QCM. What can be qualitatively inferred is the following: a) the changes in frequency and dissipation are fast and abrupt and the baseline is always recovered after injection of the TE-salt baseline solutions; b) there is a relationship between the concentration of the electrolyte and the changes in frequency and dissipation; c) there is a strong overtone dependence, with a spread in recorded frequency and dissipation changes of the overtones for any given concentration; d) the dissipation changes are not negligible.

Figure 7:
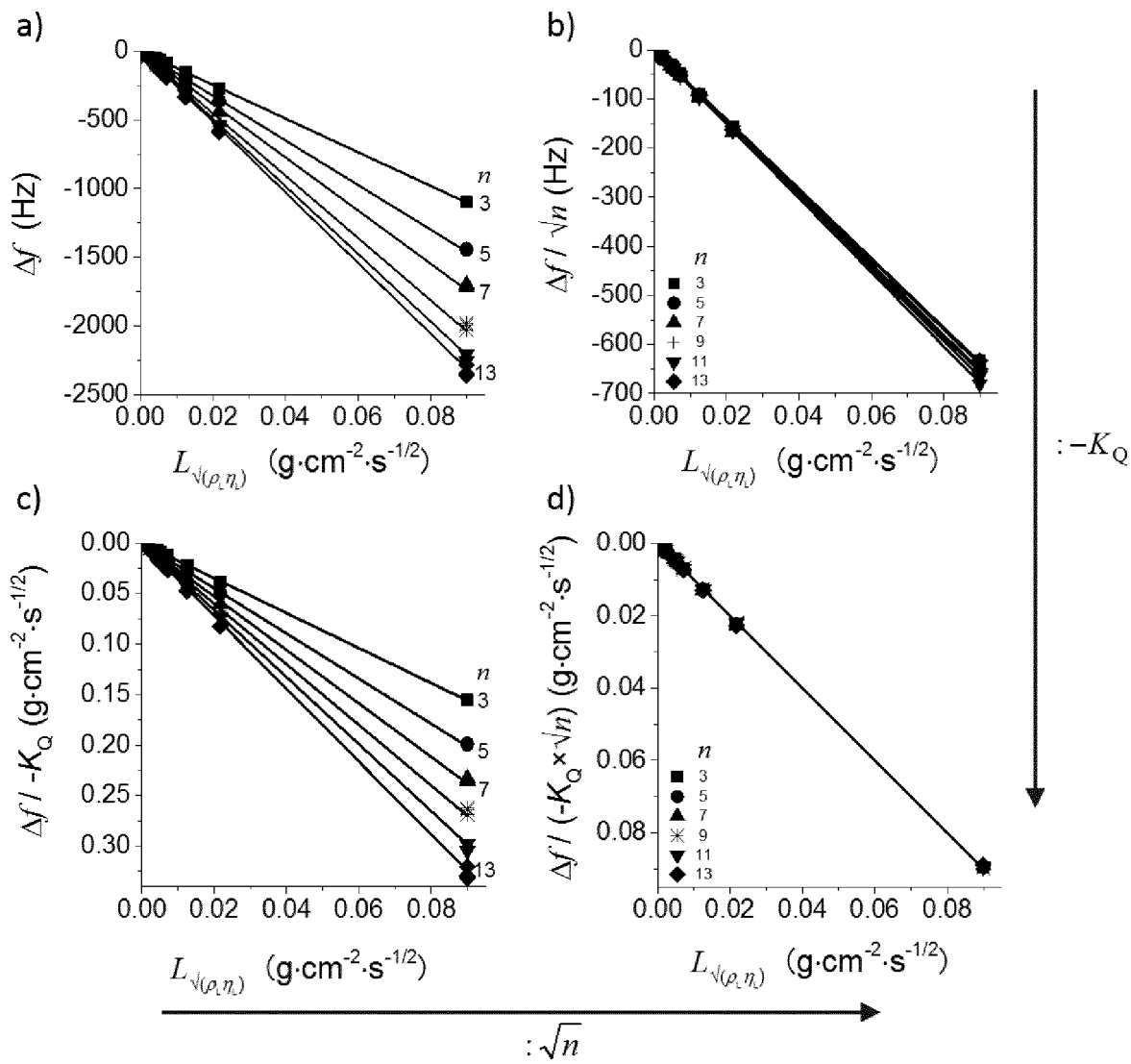
FIG. 7 illustrates frequency responses of a resonator experimentally obtained for a number of fluids comprising different buffer salt solutions.

Following the mathematical treatment above, i.e. Eq. 3, the experimental data may be illustrated as in FIG. 7. From the above it is clear that the resonator response is proportional to $((\rho_{el}\eta_{el})^{1/2} - (\rho_{bl}\eta_{bl})^{1/2})$, wherein the $\rho_{bl}$ and $\eta_{bl}$ are the density and viscosity of the TE buffer baseline solution (the first validation fluid), the $\rho_{el}$ and $\eta_{el}$ are the density and viscosity of the one or more additional validation fluids (aqueous electrolytes, produced by adding different salt concentrations to the TE buffer baseline solution).

From these data the validity of the resonator may be determined as discussed above, for example, in relation to FIG. 4.

Thus, the method 300 and the provided experimental data of FIGS. 5 and 7 illustrate the validation of the QCM-D response based on the recording of several overtones for a baseline buffer solution and a salt solution of at least one concentration in order to 1) verify the dependence of the frequency response on the bulk properties of the electrolyte solution under study; 2) validate the response of each and any of the harmonic oscillations of the crystal under the specific experimental set-up.

Figure 8:
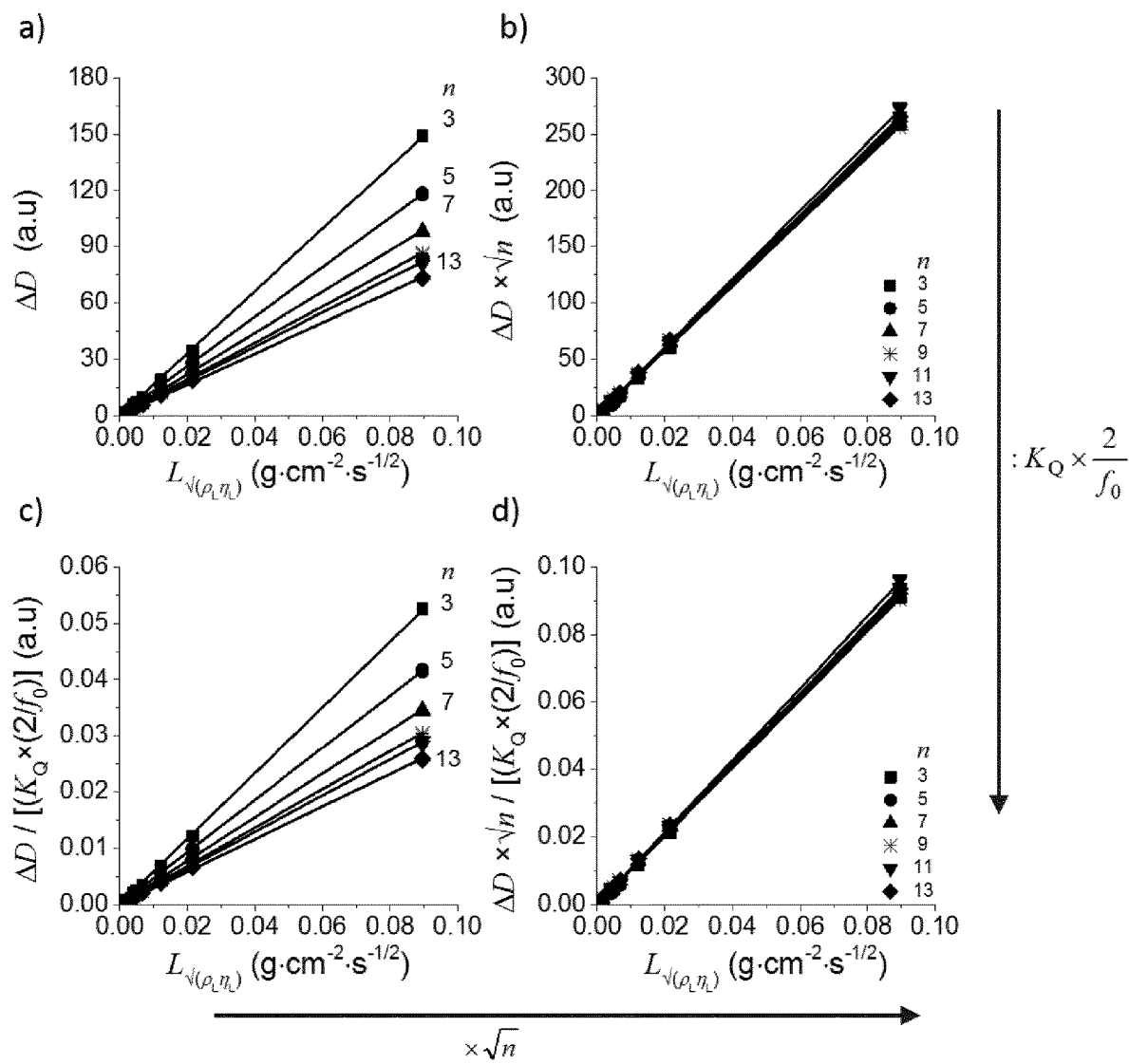
FIG. 8 illustrates dissipation responses of a resonator experimentally obtained for a number of fluids comprising different buffer salt solutions.

FIG. 8 illustrates experimental data obtained by using dissipation monitoring and the mathematical treatment based on Eq. 5 above.

Frequency and Dissipation Changes in Response to Concentration

As discussed earlier, the approach described above relies on the knowledge of the viscoelastic properties of the liquid environment, e.g. density and viscosity of the salt-TE solutions. Next it is exemplified that alternatively, or in combination, the concentration of the validation liquid may be used in the method for validating a resonator. In other words, the concentration may be used in place of the viscoelastic properties to parameterize functions or relationships, such as Eqs. 3 and 5.

Figure 9:
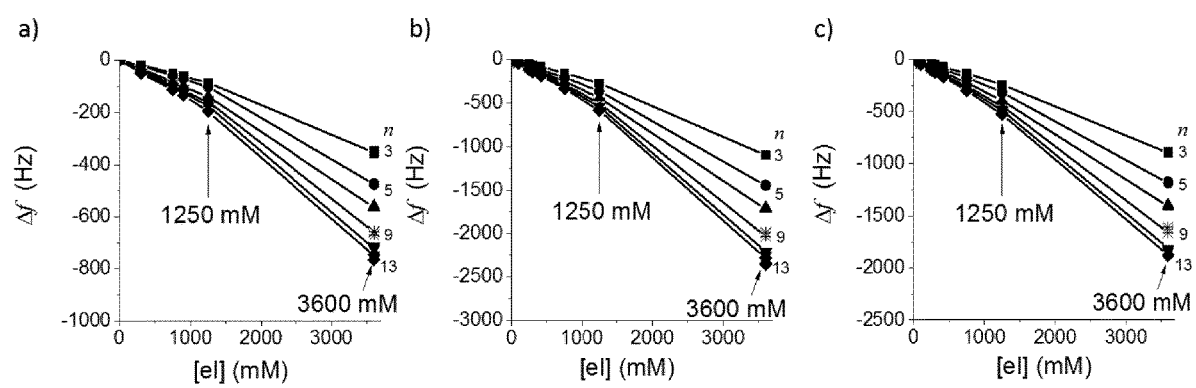
FIG. 9 illustrates frequency responses of a resonator experimentally obtained as function of concentration of different buffer salt solutions.
Figure 10:
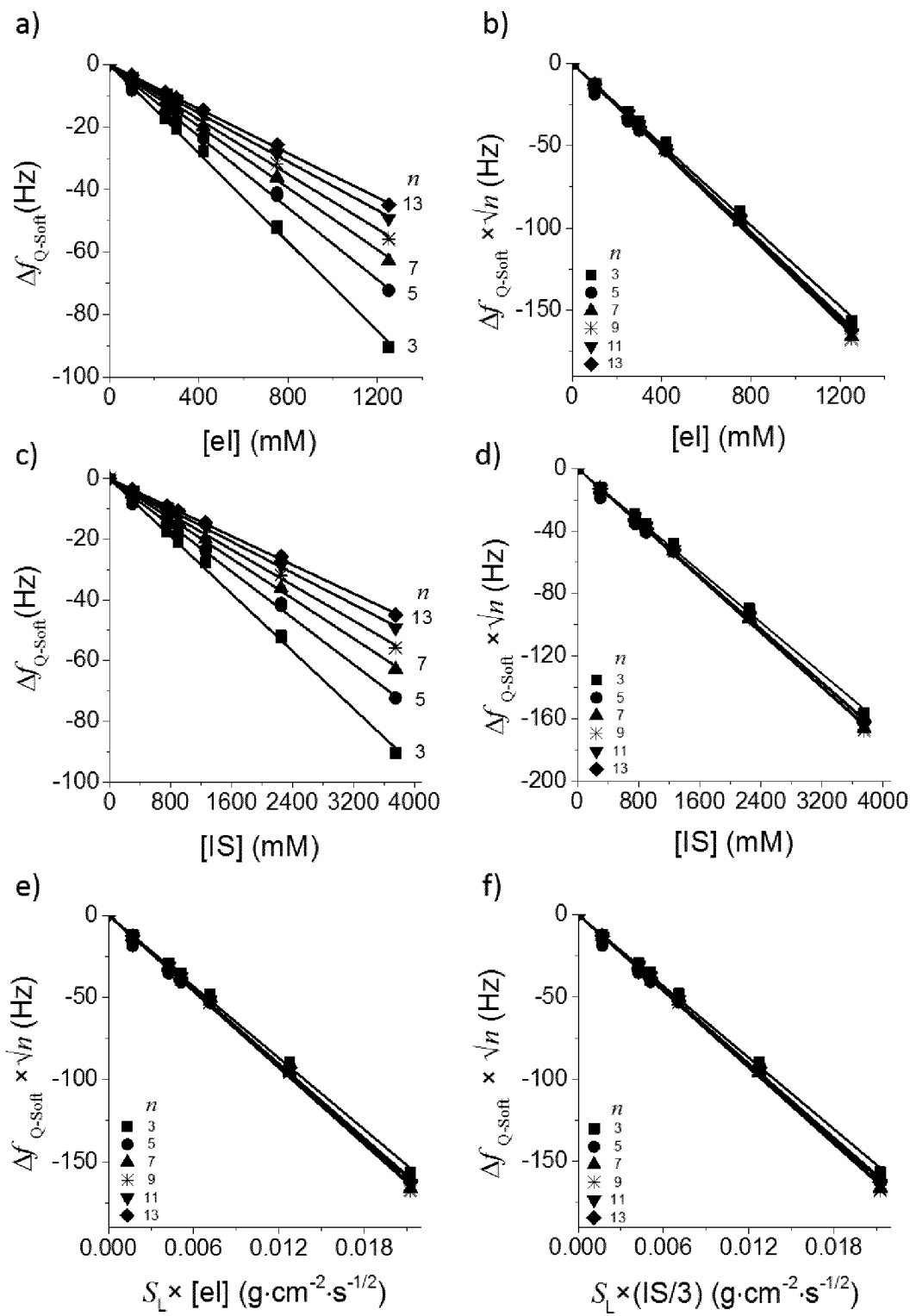
FIG. 10 illustrates frequency responses of a resonator experimentally obtained for a number of fluids comprising salt solutions of different concentrations or ionic strength.
Figure 11:
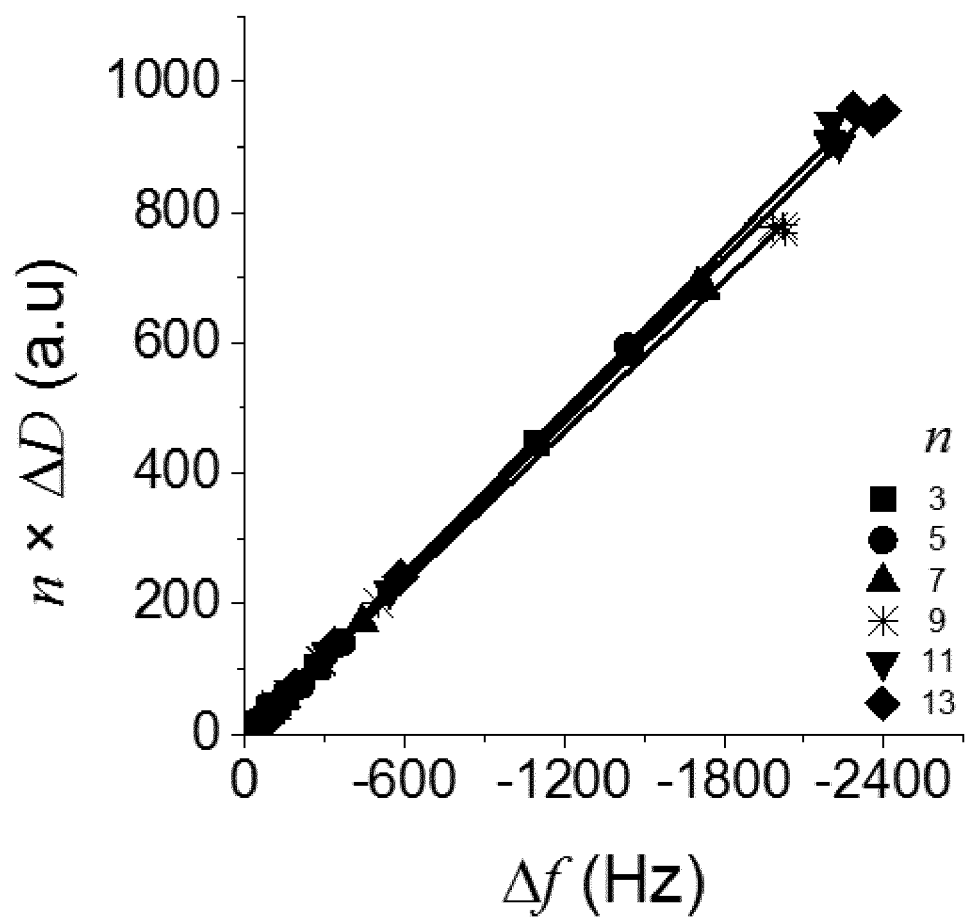
FIG. 11 illustrates the relationship between frequency and dissipation.

In agreement with the linear range of the dependence of both density and viscosity of these electrolytes on their concentration (FIG. 6), as shown in FIG. 9 for NaCl-TE (a), $CaCl_2$-TE (b), and $MgCl_2$-TE (c), the change in frequency depends linearly, for each overtone, on the concentration [el] for concentrations lower than 1300 mM. This suggests that analogously to Eq. 3, there is a three-term equation relating the change in frequency with the overtone number, the crystal properties and the concentration, as shown in FIG. 10a.

The validity of the overtone dependence is shown in FIG. 10b, where after the correction for the overtone number, the different lines merge into one, analogously to FIG. 7b. The slope of FIG. 10b does not correspond to the crystal-parameters term, i.e. $K_Q$. The reason for this discrepancy is the relationship between concentration and viscoelastic properties of the fluids.

Using $L_{[el]}$ as a term to describe the liquid properties term, $$L_{\sqrt{\rho_L \eta_L}},$$

Eq. 3 may be written as:

$$\Delta f_{Q\text{-}Soft} = -K_Q \times 1/\sqrt{n} \times L_{[el]} \qquad \text{Eq. 6}$$

In the linear range of the density and viscosity dependence on the concentration illustrated in FIG. 6, the $L_{[el]}$ term linearly depends on the concentration via a proportionality constant $S_L$, which may be determined from theoretical or empirical relationships, e.g., such as those in FIG. 6:

$$L_{[el]} = S_L \times [el].$$

Eq. 6, therefore, can be written as:

$$\Delta f_{Q\text{-}Soft} = -K_Q \times 1/\sqrt{n} \times (S_L \times [el]) \qquad \text{Eq. 7}$$

Following the above mathematical treatment, i.e. equation 7, the experimental data may be illustrated as in FIG. 10e for a divalent salt, $CaCl_2$-TE. From the experimental data it may be deduced that it is possible to validate the frequency response recorded at as many overtones as possible of an oscillating quartz crystal sensor when only the concentration is known for the first validation fluid and one or more additional validation fluids.

Frequency and Dissipation Changes in Response to Ionic Strength

For bio-molecules and nanomaterials the ionic strength of the buffered solutions is a key parameter. Therefore, it is practically useful and important to correlate the frequency response to the ionic strength. To do that we have followed an approach similar to the one described above.

First of all we have calculated the ionic strength (IS):

$$IS = \frac{1}{2}\sum_{i=1}^{tot}[el]_i z_i^2 \qquad \text{Eq. 8}$$

where $z_i$ is the charge number of any ion, and the sum is taken over all ions (tot) in the solution. The contribution to the IS of the TE, constant for all the buffered solutions and independent of the used electrolyte, is considered negligible in this calculation. According to Eq. 8, at any given concentration the ionic strength for the 1:1 electrolyte solution of NaCl is equal to the molar concentration, while for the divalent chloride salts the IS value is three times larger than their molar concentration. This suggests that analogously to Eq. 3, there is a three-term equation relating the change in frequency with the overtone number, the crystal properties and the IS, as shown in FIG. 10c. The validity of the overtone dependence is shown in FIG. 10d, where after the correction for the overtone number, the different lines merge into one, analogously to FIGS. 7b and 10b. The slope of FIG. 10d does not correspond to the crystal-parameters term, i.e. $K_Q$. The reason for this discrepancy is the relationship between IS and viscoelastic properties of the fluids.

Thereafter, by following an approach similar to the one followed in the previous section to find the relationship between concentration and $$L_{\sqrt{\rho_L \eta_L}},$$

for the dependence of frequency response on concentration, it is possible to write
[el]=IS, for the monovalent salt;
[el]=⅓×IS for the divalent salts under study.
By substitution in Eq. 7, we obtain for the monovalent salt the same equation with [el] replaced by IS, $\Delta f_{Q\text{-}soft} = -K_Q \times 1/\sqrt{n} \times (S_L \times IS)$, and Eq. 9 for the divalent salts:

$$\Delta f_{Q\text{-}Soft} = -K_Q \times \frac{1}{\sqrt{n}} \times \left(S_L \times \frac{1}{3} IS\right) \qquad \text{Eq. 9}$$

The validity of the relationship $$L_{\sqrt{\rho_L \eta_L}} = S_L \times \frac{1}{3} IS$$

is illustrated by calculating the slope of lines in FIG. 10f by linear fit of all the experimental data: according to Eq. 9 we should have for plot f) an overtone-independent line with slope $K_Q$, and this is indeed the case.

Frequency and Dissipation Changes in Response to Fluids with Different Properties.

Given Eqs. 3 and 5, Δf and ΔD recorded for at least two fluids known to be different in at least one property (such as, but not limited to) viscosity, density, concentration, or ionic strength, even if the properties in question are unknown in terms of values or other quantitative relationships, are related by Eq. 10

$$\Delta D = -\frac{2}{f_0} \times \frac{1}{n} \times \Delta f \qquad \text{Eq. 10}$$

By plotting n×ΔD vs the Δf (FIG. 11) one single line going through the origin is obtained. The slope of this line corresponds to $2/f_0$, i.e. depends only on the fundamental frequency of the resonator when its surface roughness is negligible. An advantage of this validation procedure is the minimal information required for its implementation. No detailed information is required for the validation fluids and the only resonator parameter used is its fundamental frequency, which is typically known or can be determined experimentally in measurement instruments based on such resonators.

The person skilled in the art realizes that the present invention by no means is limited to the preferred embodiments described above. On the contrary, many modifications and variations are possible within the scope of the appended claims.

For example, resonator described above to be a QCM may be a cantilever.

The non-adsorbing surface may comprise a coated quartz crystal, the coating material being different from gold.

Solution parameters correlated to the contents of the solution, such as conductivity, pH, or optical density, may be used in place of the viscoelastic properties to parameterize functions or relationships, as exemplified above by such use of concentration and ionic strength.

The resonator response may pertain to a resonance frequency or a dissipation of the fundamental mode of the resonator or of an overtone of the fundamental mode.

The resonator may be made of a piezoelectric material and the piezoelectric material may be quartz or silicon.

The piezoelectric material may have a shear vibration mode.

The piezoelectric material may be quartz with AT, SC, BT or IT crystallographic cut.

The first and or the second validation fluid may be vacuum or a gas.

The first and the second validation fluid may be a Newtonian fluid.

The first and the second validation fluid may be aqueous.

The first and the second validation fluid may comprise at least one electrolyte.

The first and the second validation fluid may comprise an aqueous buffered electrolyte solution.

The electrolyte may be a salt, preferably calcium chloride, magnesium chloride or sodium chloride.

Additionally, variations to the disclosed embodiments can be understood and effected by the skilled person in practicing the claimed invention, from a study of the drawings, the disclosure, and the appended claims.

The invention claimed is:

1. A method for validating a resonator, the method comprises:
   providing a first set of resonator responses of the resonator pertaining to a first validation fluid,
   contacting the resonator and a second validation fluid, wherein the first and the second validation fluids have different viscoelastic properties,
   obtaining in contact with the second validation fluid a second set of resonator responses of the resonator,
   wherein each resonator response pertains to a resonance frequency or a dissipation of the resonator,
   validating the resonator by determining whether a first value is within a tolerance from a second value, the first value being a difference between at least one resonator response of the first set of resonator responses and at least one resonator response from the second set of resonator responses, the second value being based on a relationship between frequency or dissipation responses of the resonator and a function of the viscoelastic properties of the first and the second validation fluid, the function being independent of parameters of the resonator.

2. The method according to claim 1, wherein the act of providing the first set of resonator responses comprises providing a predetermined first set of resonator responses.

3. The method according to claim 1, wherein the act of providing the first set of resonator responses comprises contacting the resonator and the first validation fluid and obtaining in contact with the first validation fluid the first set of resonator responses of the resonator.

4. The method according to claim 1, wherein the relationship between resonator responses of the resonator and a function of the viscoelastic properties of the first and second validation fluid is a linear relationship.

5. The method according to claim 4, wherein the first validation fluid is a baseline solution.

6. The method according to claim 5, wherein the linear relationship is given by the resonator response being proportional to $((\rho_2\eta_2)^{1/2}-(\rho_1\eta_1)^{1/2})$, wherein the $\rho_2$ is the density of the second validation fluid, $\eta_2$ is the viscosity of the second validation fluid, the $\rho_1$ is the density of the baseline solution, and $\eta_1$ is the viscosity of the baseline solution.

7. The method according to claim 6, wherein the resonator response being proportional to $((\rho_2\eta_2)^{1/2}-(\rho_1\eta_1)^{1/2})$ is given by a proportionality factor, the proportionality factor being $$-K_Q \times \sqrt{n} = -\frac{f_0^{3/2}}{\sqrt{\pi \rho_Q \mu_Q}} \times \sqrt{n},$$

wherein $f_0$ is the fundamental resonant frequency, $\rho_Q$ is the density of the resonator, and $\mu_Q$ is the shear modulus of the resonator, and wherein n>1 is the number of the overtone of the fundamental mode.

8. The method according to claim 1, wherein the resonator is a quartz microbalance with dissipation monitoring.

9. The method according to claim 1, wherein the resonator comprises a non-adsorbing surface.

10. The method according to claim 9, wherein the non-adsorbing surface comprises a gold-coated quartz crystal.

11. The method according to claim 1, wherein the function of the viscoelastic properties of the first and second validation fluid is defined based on the concentration or the ionic strength of the first and/or second validation fluid.

12. The method according to claim 11, wherein the concentration is defined by the concentration of added salt to the first and/or second validation fluid.

13. The method according to claim 1, wherein the resonator response pertain to a resonance frequency or a dissipation of the fundamental mode of the resonator or to an overtone of the fundamental mode.

14. A method for validating a resonator, the method comprises:
providing a first set of resonator responses of the resonator pertaining to a first validation fluid,
contacting the resonator and a second validation fluid, wherein the first and the second validation fluids have different viscoelastic properties,
obtaining in contact with the second validation fluid a second set of resonator responses of the resonator,
wherein each resonator response pertains to a resonance frequency or a dissipation of the resonator,
validating the resonator by comparing a first and a second value, the first value being obtained from at least one resonator response of the first set of resonator responses and at least one resonator response from the second set of resonator responses, the second value being based on a linear relationship between frequency or dissipation responses of the resonator and a function of the viscoelastic properties of the first and the second validation fluid,
wherein the linear relationship is given by the resonator response being proportional to $((\rho_2\eta_2)^{1/2}-(\rho_1\eta_1)^{1/2})$, wherein $\rho_2$ is the density of the second validation fluid, $\eta_2$ is the viscosity of the second validation fluid, $\rho_1$ is the density of the first validation fluid, and $\eta_1$ is the viscosity of the first validation fluid.

15. A method for validating a resonator, the method comprises:
providing a first set of resonator responses of the resonator pertaining to a first validation fluid,
contacting the resonator and a second validation fluid, wherein the first and the second validation fluids have different viscoelastic properties,
obtaining in contact with the second validation fluid a second set of resonator responses of the resonator,
wherein each resonator response pertains to a resonance frequency or a dissipation of the resonator,
validating the resonator by comparing a first and a second value, the first value being obtained from at least one resonator response of the first set of resonator responses and at least one resonator response from the second set of resonator responses, the second value being based on a linear relationship between frequency or dissipation responses of the resonator and a function of the viscoelastic properties of the first and the second validation fluid,
wherein the linear relationship is given by the resonator response being proportional to $((\rho_2\eta_2)^{1/2}-(\rho_1\eta_1)^{1/2})$ wherein $\rho_2$ is the density of the second validation fluid, $\eta_2$ is the viscosity of the second validation fluid, $\rho_1$ is the density of the first validation fluid, and $\eta_1$ is the viscosity of the first validation fluid, wherein the first validation fluid is a baseline solution.

* * * * *